April 7, 1959  O. AMIET  2,881,006
CHUCK WITH FIXED CAM AND AXIALLY MOVABLE JAWS
Filed June 1, 1956  2 Sheets-Sheet 1

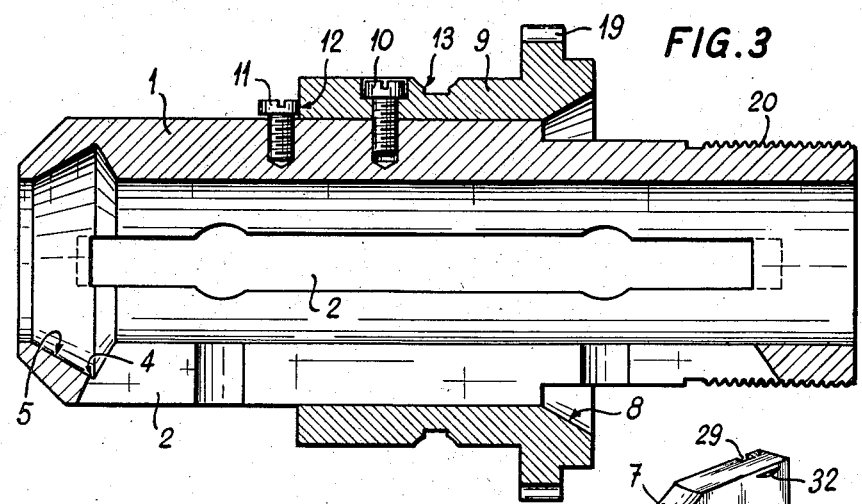
FIG. 3
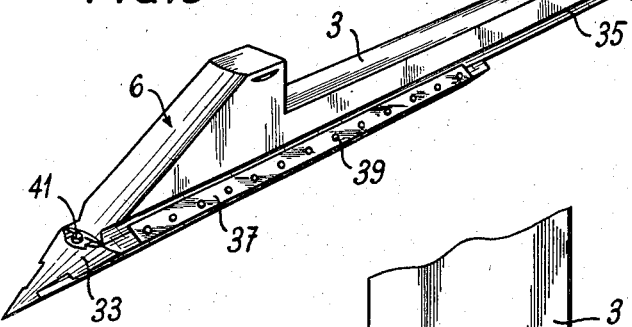
FIG. 5
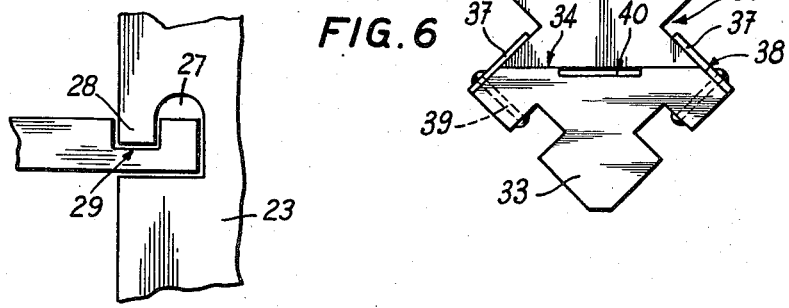
FIG. 6
FIG. 7

2,881,006
CHUCK WITH FIXED CAM AND AXIALLY MOVABLE JAWS

Oscar Amiet, Geneva, Switzerland, assignor to Christen & Co., A.G., Bern, Switzerland, a firm of Switzerland Application June 1, 1956, Serial No. 588,893

Claims priority, application Switzerland June 25, 1955

10 Claims. (Cl. 279—53)

The present invention has for object a chuck for machine-tool comprising at least two tightening clamps and a control device allowing to move them axially.

This chuck is characterized by the feature that it comprises a main body in which are provided longitudinal slits intended to guide laterally said clamps, this main body showing two conical bearing surfaces, one situated at one of the extremities of said slits and the other facing these latter, each clamp showing two inclined surfaces each engaging one of said bearing surfaces for transforming the axial displacements of the clamps into a radial one, these clamps remaining parallel to themselves during these displacements.

The annexed drawing shows, by way of example, one embodiment of the object of the invention.

Fig. 3 is a sectional view of a detail, along line III—III of Fig. 2, on an enlarged scale.

Fig. 5 is a perspective view of a tightening clamp provided with a liner.

Fig. 6 is a lateral view of this clamp on an enlarged scale.

Fig. 7 shows on an enlarged scale a detail of Fig. 4.

Figure 1:
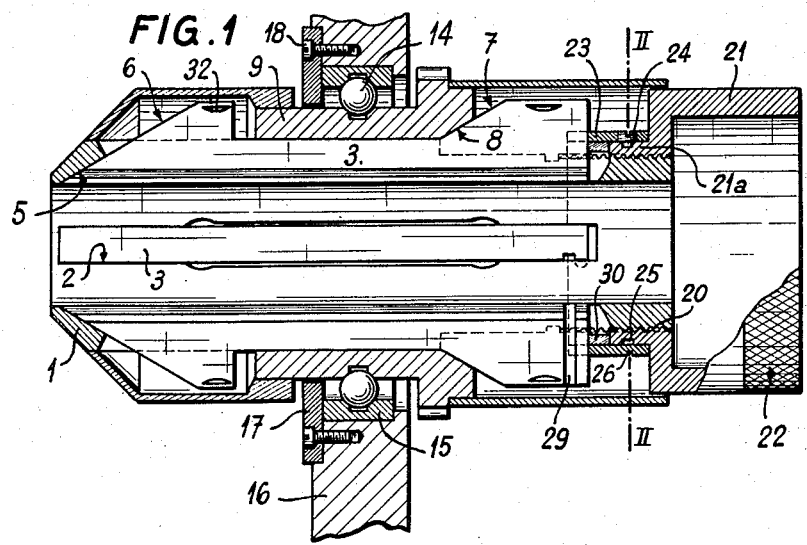
Fig. 1 is an axial sectional view of the chuck.

The chuck shown (Figs. 1, 2 and 3) comprises a main body made of two members one of which is a tubular member 1; four longitudinal slits 2 are provided by milling, in this tubular member. These slits are arranged at 90° one from another and intended to guide tightening clamps 3. An annular recess 4 is provided inner the tubular member 1, near one of its extremities, and opens on the extremities of the slits 2. One of the walls of this recess is constituted by a continuous frusto-conical surface 5, obtained by turning, forming a bearing surface for an inclined surface 6 of each clamp 3. These clamps show a second inclined surface engaging a continuous frusto-conical bearing surface 8 provided at the extremity of an outer ring 9, which constitutes the second member of the main body, and which is secured on the tubular member 1 by means of screws 10 (Figs. 1 and 3). The axial position of the ring 9 on the member 1 is determined by a set of stop screws 11, the heads of which have been worked by turning (see reference number 12); this last work is done on the whole screws 11, when they are in place on member 1. The ring 9 shows a groove 13 constituting a rolling surface for balls 14; these latter roll, on the other hand, inner a ring 15 fitted in a recess of the frame 16 of the machine on which is mounted the chuck. An annular plate 17, secured by means of screws 18, holds in place the ring 15 in the recess (Fig. 1). The chuck is thus rotatably mounted on the machine by means of only one ball-bearing. The ball-bearing could also be provided with an inner ring which would be fitted on the ring 9; one could also provide several ball-bearings instead of only one. The ring 9 shows an outer tooth 19 by means of which the chuck is rotatably driven. This tooth could be replaced by a belt-pulley; it could also serve to control a measuring device indicating the angular position of the chuck; moreover, the ring 9 could carry stop members allowing to control the amplitude of the angular displacements of the chuck.

Figure 4:
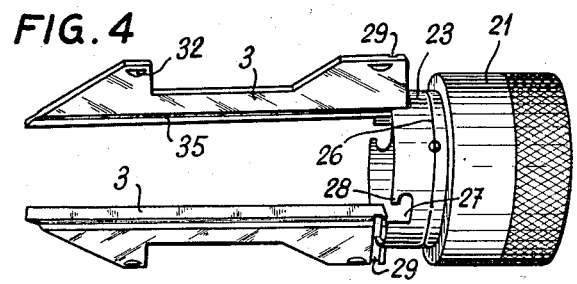
Fig. 4 is a perspective view of a detail of the chuck.

The tubular member 1 shows, at its extremity opposite to this one where the recess 4 is provided, a threaded part 20 on which is screwed the part 21a of a nut 21 outwardly knurled at 22, and which carries a sleeve 23 (Figs. 1 and 4). This sleeve 23 can rotate on the nut 21a; it is made axially rigid with the nut by a number of screws 24 entering an outer groove 25 of this nut. The screws 24 are prevented from loosening by an annular wire-spring 26 engaged in a slit of these screws; this spring could be replaced by pins. The sleeve 23 shows four notches 27 in which are engaged the extremities of the clamps 3. Each notch is provided with a finger 28 (Fig. 7) entering a groove 29 provided in each clamp 3. Owing to this arrangement, the clamps 3 are axially rigid with the sleeve 23 while being able to move radially with respect to it. A ring 30, constituting a strut, made of tempered steel, is interposed between the clamps 3 and the extremity of part 21a of the nut 21.

When the nut 21 is screwed on the tubular member 1 of the chuck, an axial displacement of the four clamps is produced towards the left side of Fig. 1. Owing to the inclined surfaces 6 and 7 of the clamps 3, engaged respectively with the conical bearings 5 and 8, the axial displacement of the clamps is transformed into a radial displacement towards the center, thus producing the tightening of the chuck; it is the ring 30, interposed between the nut 21a and the clamps, which transmits to these latter the strength necessary to this tightening. It is to be noted that, when moving, the clamps remain parallel to themselves, so that they act by their whole length on the element tightened by the chuck.

Figure 2:
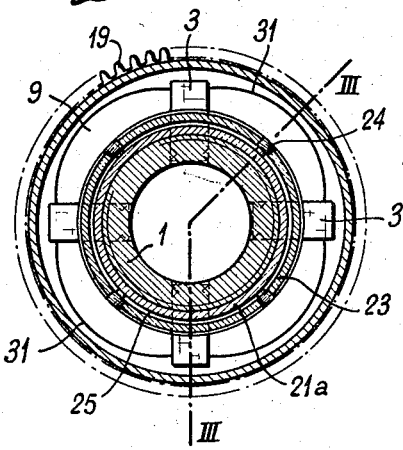
Fig. 2 is a sectional view along line II—II of Fig. 1.

The chuck comprises moreover two sets of leaf-springs 31 (Fig. 2). Each of these springs is bent between two consecutive clamps, one of its extremities being engaged in a recess 32 provided in the clamp. These springs urge to return the clamps 3 outwards radially. They could be replaced by springs bearing on the one hand on the clamps and on the other hand on the tubular member 1. Owing to this arrangement, when the nut 21 is unscrewed, for moving axially the clamps towards the right side of Fig. 1 and thus removing the inclined surfaces 6 and 7 respectively from the bearing surfaces 5 and 8, the clamps, returned by the springs 31, are automatically moved radially outwards, thus producing the loosening of the chuck.

The chuck makes it possible to tighten elements of a diameter going from about 1¼ inch to 9/16 inch. For tightening elements of a smaller diameter, even less than 1/16 inch for instance, a liner 33 is secured on each clamp; this liner has the general shape of a square sectional parallelepiped (Figs. 5 and 6); the section could also be diamond-shaped. One of the edges of this parallelepiped has been cut away in order to form a surface 34 bearing on the basis of the clamps. These latters show, on their lateral faces, two longitudinal grooves 35 engaged by small plates 37 secured to the faces 38 of the liner 33; these faces 38 are contiguous to the surface 34 of the parallelepiped. These small plates 37 are secured to the liner 33 by rivets 39. The central part of the surface 34 is provided with a recess 40, so that only the lateral parts of this surface 34 bear on the basis of the clamps 3. Thus the position of the liner on the clamp does not depend from the possible wear of the center part of the basis of the clamp. Owing to the square section of the liner 33, its working is simple and accurate. The mounting of the liners 33 is carried out when engaging them, from the front extremity of the chuck, on the clamps and when sliding them on the clamps until an abutment 41, carried by the liner, thrusts against the extremity of the clamp (Fig. 5).

For moving them away, it is sufficient to introduce into the chuck, from the rear side, a rod by means of which all the liners are pushed together towards the front side of the chuck.

The chuck according to the invention presents the advantage of allowing the tightening on the whole length of the clamps and of operating precisely while its working is very simple.

What I claim is:

1. In a chuck for machine-tool comprising at least two tightening clamps and a control device allowing to move them axially, a tubular member, longitudinal slits in said member intended to guide laterally said clamps, a first conical bearing surface provided in said tubular member at one of the extremities of said slits, a threaded section of said tubular member, at the other extremity of it, a nut screwed on said threaded section, a sleeve rotatably mounted on said nut and to which the clamps are hooked, means whereby said sleeve is axially rigid with said nut, an outer ring fitted on the tubular member, a second conical bearing surface provided in said outer ring, facing the slits, two inclined surfaces provided in each clamp and each engaging one of said conical surfaces, the whole in such a way that axial displacements of the clamps be transformed into radial ones, the clamps remaining parallel to themselves during these displacements.

2. In a chuck according to claim 1, notches provided in said sleeve, in which enter the clamps, a groove provided in each clamp, said sleeve showing fingers entering said groove, the whole in such a way that said clamps are axially rigid with said sleeve while being able to move radially with respect to it.

3. In a chuck according to claim 1, two longitudinal grooves in each clamp, a liner engaged in said grooves for enlarging the clamps in the direction of the center of the chuck, thus allowing the tightening of small elements.

4. In a chuck according to claim 3, the feature that said liners are parallelepipeds of square section, one of the edges of said parallelepipeds having been cut away for forming a surface intended to bear against the basis of the clamps.

5. In a chuck according to claim 3, longitudinal small plates secured to the liner and intended to enter the grooves of the clamps for connecting the liner to the clamp.

6. In a chuck for a machine-tool, the combination of a tubular member provided with two longitudinally spaced parallel coaxial frusto-conical surface areas facing inwardly and rearwardly and with at least one pair of diametrically opposed radial slots extending longitudinally between the two coaxial surface areas and opening into the outer surface of the tubular member to the rear of the rear coaxial surface area, means coaxially rigid with the tubular member for rotating said tubular member, a nut coaxial with said tubular member and threadedly engaging the rear end of the latter, a stationary carrier for the tubular member inside which the latter is revolubly held against longitudinal movement, a clamp engaging each slot in the tubular member and provided with two outer surface areas matching the two said corresponding frusto-conical surface areas and the rear end of which engages the front end of the nut, the rotation of said nut with reference to the tubular member urging the clamps forwardly inside their slots over said frusto-conical surface areas of the tubular member and consequently inwardly and radially of the chuck.

7. In a chuck for a machine-tool including a frame, the combination of a tubular member provided with two longitudinally spaced parallel coaxial frusto-conical surface areas facing inwardly and rearwardly and with at least one pair of diametrically opposed radial slots extending longitudinally between the two coaxial surface areas and opening into the outer surface of the tubular member to the rear of the rear coaxial surface area, means coaxially rigid with the tubular member for rotating said tubular member, a nut coaxial with said tubular member and threadedly engaging the rear end of the latter, a bearing member rigid with the machine-tool frame and provided with an opening coaxially surrounding the tubular member, a ball bearing fitted between said bearing member and the tubular member, a clamp engaging each slot in the tubular member and provided with two outer surface areas matching the two said corresponding frusto-conical surface areas and the rear end of which engages the front end of the nut, the rotation of said nut with reference to the tubular member urging the clamps forwardly inside their slots over said frusto-conical surface areas of the tubular member and consequently inwardly and radially of the chuck.

8. In a chuck for a machine-tool, the combination of a tubular member including a main body provided at its front end with an inwardly and rearwardly facing surface area and an outer ring rigidly secured to the said body and provided at its rear end with a second coaxial surface area of same angular opening as the first surface area, the body being provided with at least one pair of diametrically opposed radial slots extending longitudinally between the two coaxial surface areas and opening into the outer surface of the body of the tubular member to the rear of the rear coaxial surface area, means coaxially rigid with the outer ring for rotating said tubular member, a nut coaxial with said tubular member and threadedly engaging the rear end of the body of the latter, a stationary carrier for the outer ring inside which the latter is revolubly held against longitudinal movement, a clamp engaging each slot in the outer ring and provided with two outer surface areas matching the two said corresponding frusto-conical surface areas and the rear end of which engages the front end of the nut, the rotation of said nut with reference to the body of the tubular member urging the clamps forwardly inside their slots over said frusto-conical surface areas and consequently inwardly and radially of the chuck.

9. In a chuck for a machine-tool, the combination of a tubular member provided with two longitudinally spaced parallel coaxial frusto-conical surface areas facing inwardly and rearwardly and with at least one pair of diametrically opposed radial slots extending longitudinally between the two coaxial surface areas and opening into the outer surface of the tubular member to the rear of the rear coaxial surface area, means coaxially rigid with the tubular member for rotating said tubular member, a nut coaxial with said tubular member and threadedly engaging the rear end of the latter, a stationary carrier for the tubular member inside which the latter is revolubly held against longitudinal movement, a clamp engaging each slot in the tubular member and provided with two outer surface areas matching the two said corresponding frusto-conical surface areas and the rear end of which engages the front end of the nut, a spring system urging said clamps radially, outwardly and rearwardly, the rotation of said nut with reference to the tubular member urging the clamps forwardly inside their slots over said frusto-conical surface areas of the tubular member and consequently inwardly and radially of the chuck.

10. In a chuck for a machine-tool, the combination of a tubular member provided with two longitudinally spaced parallel coaxial frusto-conical surface areas facing inwardly and rearwardly and with at least one pair of diametrically opposed radial slots extending longitudinally between the two coaxial surface areas and opening into the outer surface of the tubular member to the rear of the rear coaxial surface area, means coaxially rigid with the tubular member for rotating said tubular member, a nut coaxial with said tubular member and threadedly engaging the rear end of the latter, a stationary carrier for the tubular member inside which the latter is adapted to revolve and is held against longitudinal movement, a clamp engaging each slot in the tubular member and provided with two outer surface areas matching the two said corresponding frusto-conical surface areas and the rear end of which engages the front end of the nut, two sets of leaf springs bent facing for engagement therewith the front and rear ends respectively of the successive clamps in a peripheral direction, the ends of the springs engaging said clamps to urge the latter rearwardly and radially outwardly, the rotation of said nut with reference to the tubular member urging the clamps forwardly inside their slots over said frusto-conical surface areas of the tubular member and consequently inwardly and radially of the chuck.

References Cited in the file of this patent

UNITED STATES PATENTS

| | | |
|---|---|---|
| 1,651,087 | Ellrich | Nov. 29, 1927 |
| 1,674,223 | Rabut | June 19, 1928 |
| 1,674,224 | Rabut | June 19, 1928 |
| 2,682,413 | Tripp | June 29, 1954 |